(12) United States Patent  
Patel et al.

(10) Patent No.: US 7,156,561 B2
(45) Date of Patent: Jan. 2, 2007

(54) OPTICAL CONNECTOR

(75) Inventors: Naresh C. Patel, Howell, NJ (US); Glenn Gerard Wilder, Hazlet, NJ (US); Gerald Nykolak, Long Beach, NY (US); Lars Erik Eskildsen, Holmdel, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 0 days.

(21) Appl. No.: 11/417,440

(22) Filed: May 3, 2006

(65) Prior Publication Data

US 2006/0204179 A1    Sep. 14, 2006

Related U.S. Application Data

(62) Division of application No. 10/394,434, filed on Mar. 21, 2003, now Pat. No. 7,048,447.

(51) Int. Cl.  
*G02B 6/38* (2006.01)

(52) U.S. Cl. .......................................... 385/59; 385/63

(58) Field of Classification Search ................ 385/59, 385/60, 63, 71, 72, 86, 90, 91  
See application file for complete search history.

(56) References Cited

U.S. PATENT DOCUMENTS

| 5,214,730 A | 5/1993 | Nagasawa et al. |
| 5,896,485 A | 4/1999 | Kirby |
| 6,130,977 A | 10/2000 | Rosson |
| 6,328,479 B1 | 12/2001 | Schofield et al. |
| 6,400,882 B1 | 6/2002 | Sun et al. |
| 6,416,236 B1 | 7/2002 | Childers et al. |
| 6,425,693 B1 | 7/2002 | Schmatz |
| 6,464,408 B1 | 10/2002 | Nolan |
| 6,478,475 B1 | 11/2002 | Schofield et al. |

FOREIGN PATENT DOCUMENTS

EP        0800100        8/1997

*Primary Examiner*—Khiem Nguyen  
(74) *Attorney, Agent, or Firm*—Meyer & Williams PC; Stuart H. Mayer, Esq.

(57) ABSTRACT

An optical fiber connector plug includes a housing through which extends a cable containing at least one optical fiber. A ferrule, which is supported by the housing, is provided for receiving the optical fiber. The ferrule has a mating facet and an opposing rear facet located in the housing. The ferrule has at least one guide pin thru-hole and at least one optical fiber thru-hole extending between the mating facet and the opposing rear facet. The guide pin thru-hole has an opening portion extending inward from the mating facet. The opening portion is tapered outward to meet the mating facet in an oblique manner such that the opening portion has a diameter in the plane of the mating facet that is greater than a diameter of a remainder of the guide pin thru-hole.

26 Claims, 5 Drawing Sheets

DESIGN OF THE CHAMFER

OPTICAL CONNECTOR

CROSS REFERENCE TO RELATED APPLICATION

This application is a divisional of U.S. patent application Ser. No. 10/394,434, filed on Mar. 21, 2003, now U.S. Pat. No. 7,048,447 and entitled "Optical Connector," which is incorporated by reference in its entirety herein.

FIELD OF THE INVENTION

The present invention relates generally to optical fiber connectors and more particularly to a multifiber optical connector

BACKGROUND OF THE INVENTION

Optical fibers are being increasingly utilized for a variety of applications such as data transmission. In order to interconnect the optical fibers, fiber optic connectors are typically mounted upon the end portions of the optical fibers that are to be mated. The optical connections established by mating a pair of fiber optic connectors preferably have relatively low attenuation and a small return loss. In this way such connectors permit the implementation of data transmission at high bandwidths and high transmission capacities over relatively long distances. Moreover, the increasing demand for high transmission capacities leads to optical fibers that are laid in parallel, which in turn require multifiber connectors.

A variety of standardized optical fiber connectors have been developed which are widely used in the industry to interconnect the optical fibers employed in transmission systems. One known type of fiber optic connector is a so-called "MT" type. The MT connector has a connector housing with a front end and a ferrule movably mounted in the housing. The ferrule is biased by a spring to a forward position. When the ferrule is in the forward position, a front face of the ferrule projects from the housing. A multi-fiber cable extends into the housing. The individual fibers of the cable extend through the ferrule to the front face. The front face of the ferrule, and the ends of the fibers, are polished to form a flat surface. The fiber ends are precisely located within the ferrule. The ferrule also has pin-receiving bores. A male MT-type connector has guide pins located in the bores, which project beyond the front face of the ferrule. In a female MT connector the bores remain empty. Two cables may be connected to one another by engaging male and female MT connectors with one another so that the guide pins of the male connector enter the pin receiving bores of the female connector.

While these connectors can provide a good connection between the individual fibers of the two cables with low optical transmission losses, some modern applications are placing increased performance and reliability demands on them. In particular, the connectors must meet Telcordia GR-1435-CORE requirements. For example, Telcordia requirements specify that optical fiber connectors have an insertion loss that does not exceed 0.80 dB. The connector should continue to meet this requirement after being mated and remated 200 times without cleaning after every mating (only cleaning after 25 mates is permitted on one side of the connector and after 50 mates for the other side). The requirement is intended to ensure that the connector does not self generate contamination that may inhibit its performance. Unfortunately, conventional multifiber optical connectors generally do not satisfy this requirement unless the connector is thoroughly cleaned more frequently than the Telcordia requirements.

This insertion loss degradation is particularly problematic when these connectors are employed in optical backplanes. When used in optical backplanes the contaminated connector surfaces are often located within other equipment to which it can be difficult to gain access to clean the contamination from the connector.

SUMMARY OF THE INVENTION

In accordance with the present invention, an optical fiber connector plug includes a housing through which extends a cable containing at least one optical fiber. A ferrule, which is supported by the housing, is provided for receiving the optical fiber. The ferrule has a mating facet and an opposing rear facet located in the housing. The ferrule has at least one guide pin thru-hole and at least one optical fiber thru-hole extending between the mating facet and the opposing rear facet. The guide pin thru-hole has an opening portion extending inward from the mating facet. The opening portion is tapered outward to meet the mating facet in an oblique manner such that the opening portion has a diameter in the plane of the mating facet that is greater than a diameter of a remainder of the guide pin thru-hole.

In accordance with one aspect of the invention, the tapered opening portion is defined by curved sidewalls.

In accordance with another aspect of the invention, the tapered opening portion is defined by flat sidewalls.

In accordance with another aspect of the invention, the flat sidewalls form a 45° angle with respect to the mating facet.

In accordance with another aspect of the invention, the mating facet of the ferrule defines an oblique surface with respect to a longitudinal axis of the thru-holes.

In accordance with yet another aspect of the invention, a multifiber optical fiber connector is provided. The connector includes a first connector plug that has a first housing through which extends a cable containing at least one optical fiber. A first ferrule, which is supported by the housing, is provided to receive the optical fiber. The ferrule has a mating facet and an opposing rear facet located in the housing. The first ferrule has at least one guide pin thru-hole and at least one optical fiber thru-hole extending between the mating facet and the opposing rear facet. The guide pin thru-hole has an opening portion extending inward from the mating facet. The opening portion is tapered to meet the mating facet in an oblique manner such that the opening portion has a diameter in the plane of the mating facet that is greater than a diameter of a remainder of the guide pin thru-hole. The connector also includes a second connector plug for mating with the first connector plug. The second connector plug has a second housing through which extends a cable containing at least one optical fiber. A second ferrule, which is supported by the second housing, is provided to receive a second plurality of optical fibers. The ferrule has a mating facet and an opposing rear facet located in the housing. The ferrule has at least one guide pin receptacle and at least one optical fiber thru-hole extending between the mating facet and the opposing rear facet. A guide pin is secured in the guide pin receptacle.

In accordance with another aspect of the invention, the guide pin has an end portion distal from the second ferrule. The end portion has a frustoconical shape. Alternatively, the end portion may be smoothly tapered.

In accordance with another aspect of the invention, a guide pin holding member is provided for supporting the guide pin in the guide pin receptacle.

In accordance with another aspect of the invention, an engagement member is provided for connecting the first and second housings together so that the guide pin extending from the second ferrule is secured in the guide pin thru-hole in the first ferrule.

DETAILED DESCRIPTION

Figure 1:
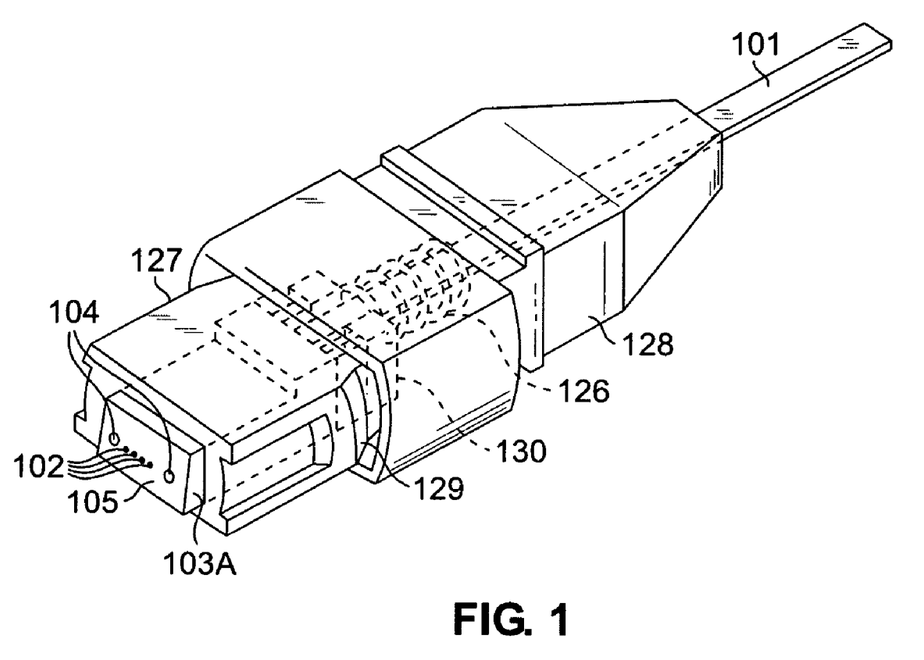
FIG. 1 shows a multifiber optical connector plug assembly in which the present invention may be employed.
Figure 2:
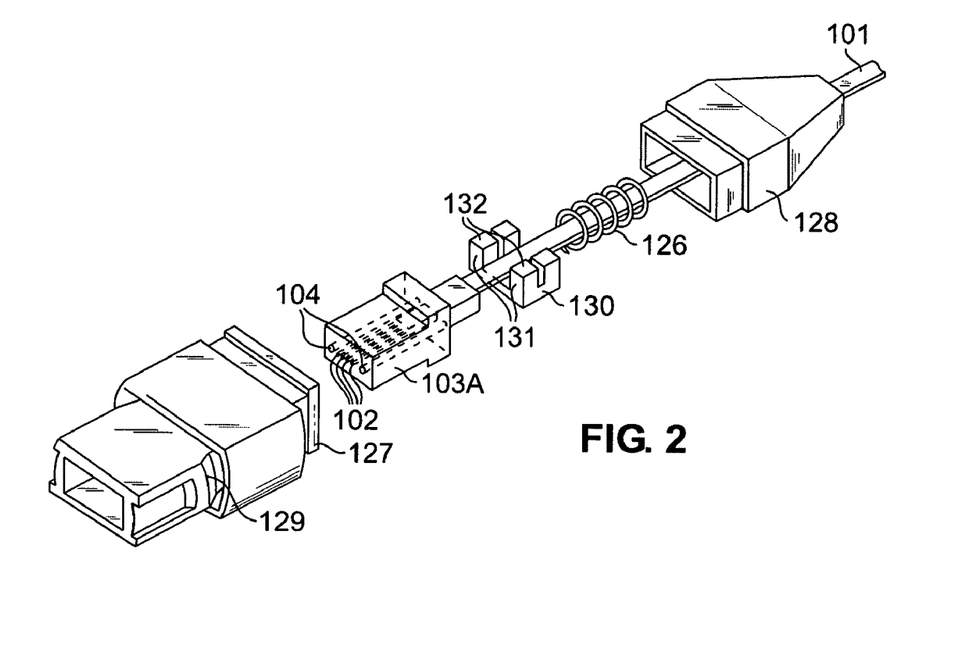
FIG. 2 shows an exploded view of the multifiber optical connector plug assembly depicted in FIG. 1.

One embodiment of a multifiber optical connector plug assembly in which the present invention may be employed is shown in FIG. 1 and FIG. 2. While the features of the present invention will be illustrated in connection with a particular MT-type connector, those of ordinary skill in the art will recognize that the invention can be applied to many other optical fiber connectors. Other connector types in which the present invention may be employed include, without limitation, MPX, MPO, MTP, HBMT, SMC and OGI connectors.

The multifiber optical connector plug assembly includes a multifiber connector ferrule 103A housing a plurality of transversely arranged optical fibers 102 projecting out of the end of an optical fiber ribbon 101 and having a pair of guide pin insertion holes 104 with the transversely arranged optical fibers 102 located therebetween. A connecting facet 105 of the ferrule 103A has a flat surface nearly perpendicular to the optical axes of the optical fibers 102. A guide pin holding member 130 is provided behind the multifiber connector ferrule 103A for holding the guide pins inserted into the guide pin insertion holes 104 and to prevent the guide pins (when present) from extending behind the multifiber connector ferrule 103A. A spring member 126 is provided behind the guide pin holding member 130 for pressing the multifiber connector ferrule 103A against a mated multifiber connector ferrule in an axial direction. A front housing 127 and a rear housing 128 integrally house the multifiber connector ferrule 103A, the guide pin holding member 130, and the spring member 126 together.

As shown in FIG. 2, the guide pin holding member 130 has guide pin holding holes 131 having inner diameters slightly smaller than those of the guide pins, and slits 132 for splitting the upper parts of the circumferences of the guide pin holding holes 131. When the guide pins (not shown in FIG. 2) are inserted into the guide pin insertion holes 104 and reached the guide pin holding member 130 located behind the multifiber connector ferrule 103A, the slits 132 are elastically deformed by the thrusting guide pins 106 to widen the guide pin holding holes 131 such that the tip ends of the guide pins 106 can be inserted into and held inside the guide pin holding holes 131.

Figure 3:
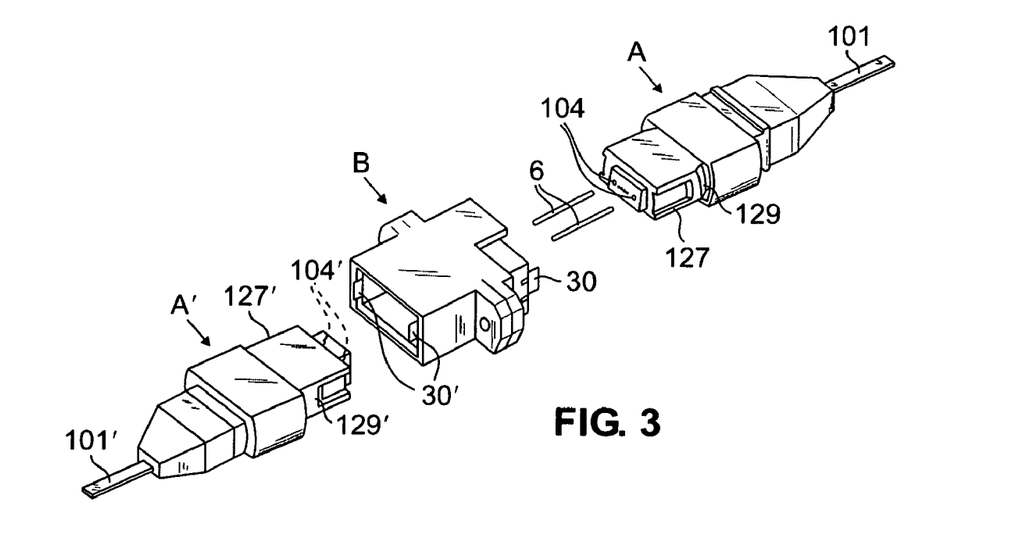
FIG. 3 shows a multifiber optical connector formed from two of the multifiber optical connector plug assemblies depicted in FIGS. 1 and 2.

As shown in FIG. 3, in connecting two multifiber optical connector plug assemblies to form a multifiber optical connector, a male multifiber optical connector plug assembly A is inserted into one opening of an adaptor B until hook members 30 provided on the adaptor B are engaged with groove portions 29 formed on the front housing 27 of the multifiber optical connector plug assembly A.

Then, a female multifiber optical connector plug assembly A' is inserted into another opening of the adaptor B until the hook members 30' provided on the adaptor B are engaged with groove portions 29' formed on the front housing 27' of multifiber optical connector plug assembly A'. The guide pins 6 are inserted into the guide pin insertion holes 104' of female multifiber optical connector plug assembly A', such that the alignment of the optical fibers housed inside the multifiber optical connector plug assemblies A and A' is provided by guide pins 6.

Figure 4:
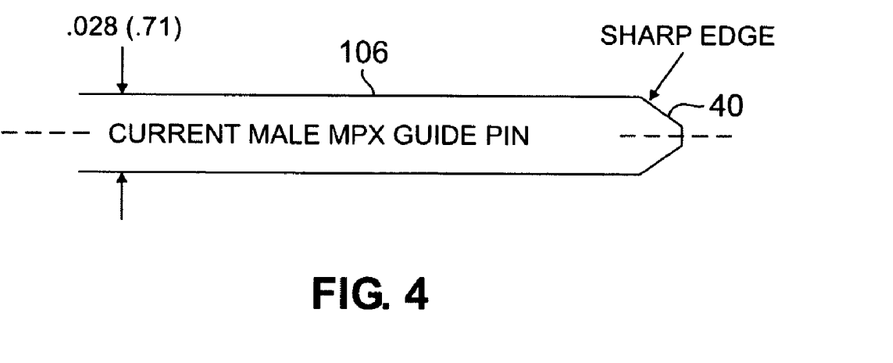
FIG. 4 shows a conventional guide pin.

In a case of reconnection or switching, the detachment of the multifiber optical connector plug assemblies is achieved by releasing the engagement of the hook members 30 and 30' of the adaptor B with the groove portions 129 and 129' of the multifiber optical connector plug assemblies A and A', and pulling the multifiber optical connector plug assemblies A and A' out of the adaptor B. As shown in FIG. 4, the tips 40 of the guide pins 106 are generally frustoconical in shape so as to define an angle of about 20°–40° relative to the longitudinal axis of the guide pin. The frustoconical shape of the guide pin tips allows for easier insertion of the guide pin into the guide pin insertion holes 104'.

The present inventors have determined that a problem with convention ferrules is that the action of mating the male connector with the female connector causes the guide pin to press against the edge of the insertion holes in the female connector, which causes small particles to break away from the edge of the insertion holes. The particles contaminate the optical fiber on the male and female ferrules in the plane of the ferrule facet 105. Continued mating and decoupling of the connectors also may cause the small particles to accumulate on or near the fiber core at the connector surface 105. These particles can attenuate light coupled through the fiber core by scattering, absorption, or by mechanically preventing intimate fiber-to-fiber contact of the respective connector surfaces 105. As such, the attenuation of the resulting optical connection significantly increases.

Figure 5:
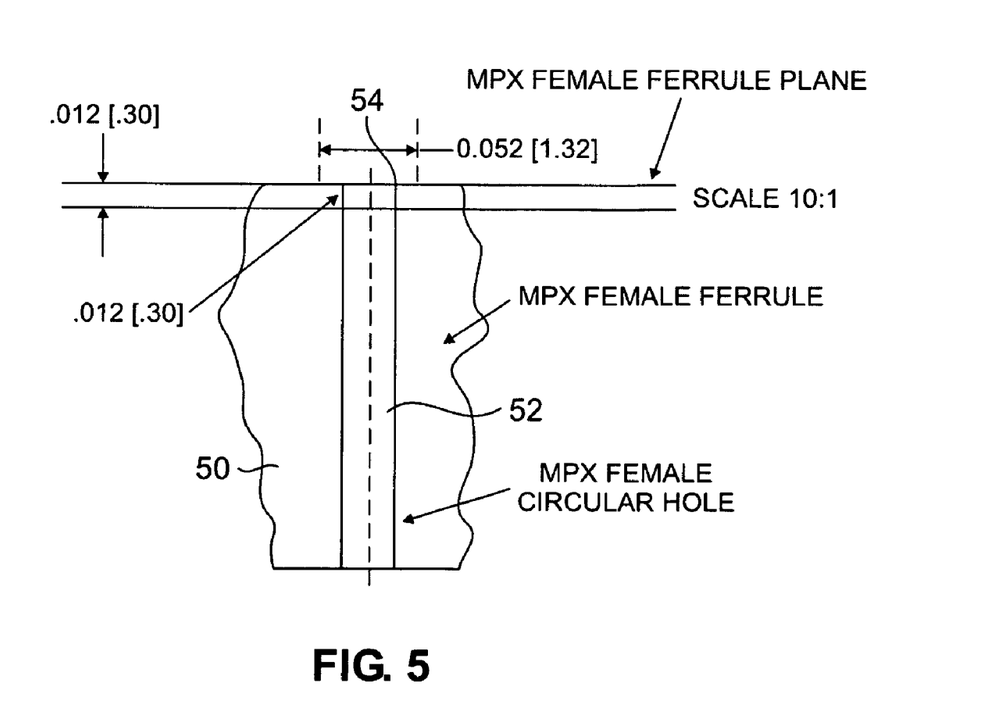
FIG. 5 shows a fragmentary, cross-sectional view of a ferrule illustrating a conventional guide pin insertion hole.
Figure 6:
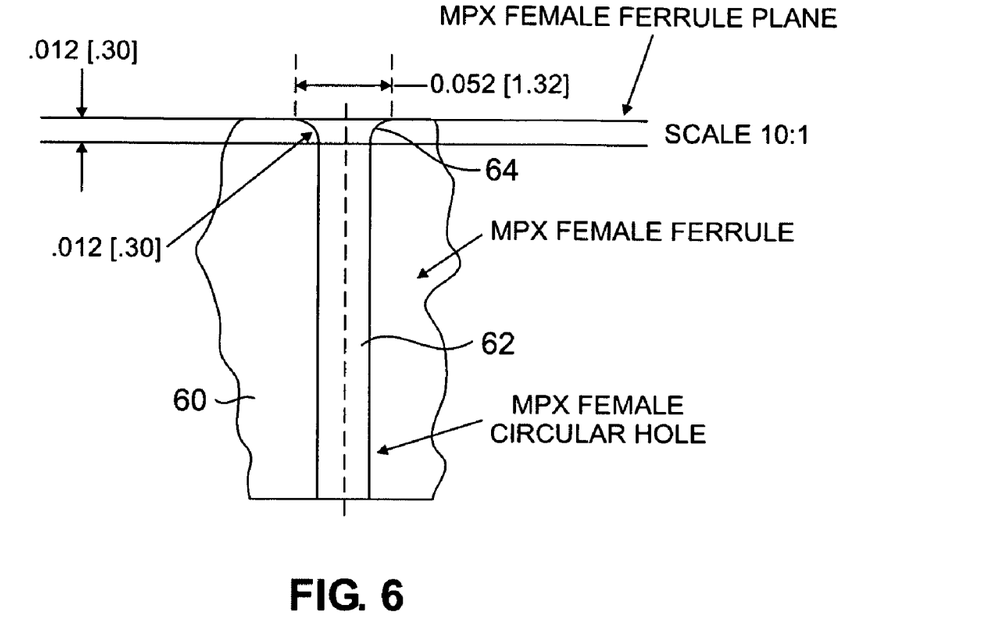
FIG. 6 shows a fragmentary, cross-sectional view of one embodiment of the ferrule constructed in accordance with the present invention.

In accordance with the present invention, the sharp edges of the guide pin insertion holes in the ferrule of the female connector are removed to reduce the likelihood of small particles breaking away and to provide a lead-in for the guide pins at the entrance to the insertion holes. FIG. 5 shows a fragmentary, cross-sectional view of a ferrule 50 illustrating a conventional guide pin insertion hole 52. The insertion hole forms a substantially right angle with the mating facet 54 of the ferrule. FIG. 6 shows a fragmentary, cross-sectional view of one embodiment of the ferrule 60 constructed in accordance with the present invention. The entrance to the insertion hole 62 of ferrule 60 is curved away from the center of the hole so that it meets the mating facet 64 at an oblique angle. That is, the entrance to the insertion hole of the ferrule is tapered outward as it approaches the mating facet 64.

Figure 7:
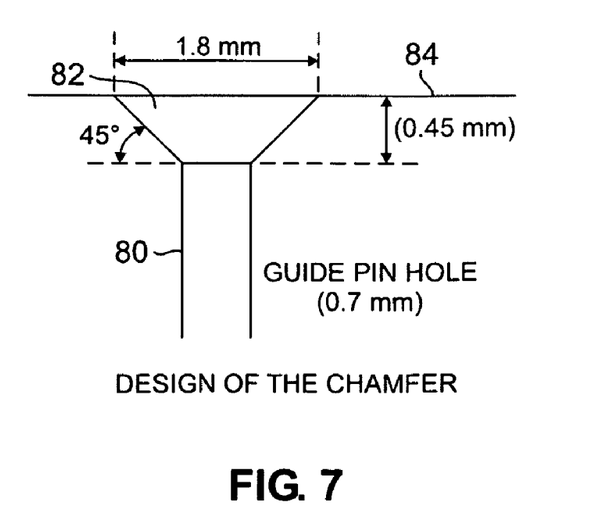
FIG. 7 shows a fragmentary, cross-sectional view of an alternative embodiment of the ferrule constructed in accordance with the present invention.

FIG. 7 shows an alternative embodiment of the invention in which the entrance to the insertion hole 82 of ferrule 80 has a flat taper instead of a curved taper as in FIG. 6. In one particular embodiment of the invention the sidewalls of the flat taper forms a 45° angle with the mating facet 84.

Figure 8:
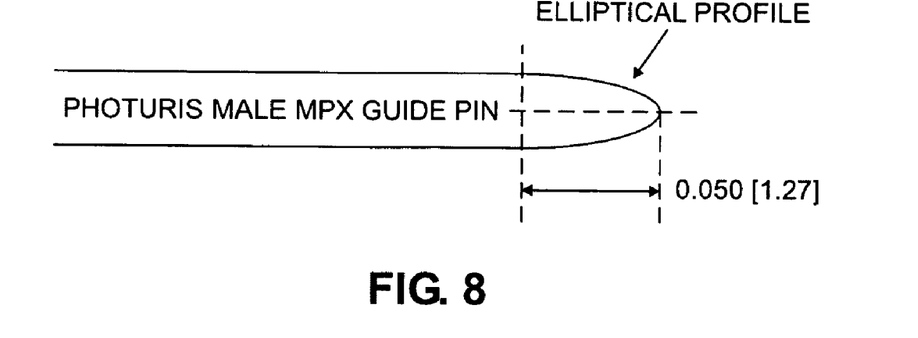
FIG. 8 shows a guide pin constructed in accordance with the present invention.

In some embodiments of the invention the tip of the guide pin is configured to eliminate the sharp edge seen in the conventional guide pin depicted in FIG. 4. Rather, as seen in FIG. 8, the tip of the guide pin has an elliptical profile to reduce the stress placed upon the edge of the guide pin insertion hole by the guide pin.

Experiments were performed using various embodiments of the present invention to determine the characteristics and reliability of the connectors. The connectors that were employed in the experiments were constructed to support eight single mode optical fibers that were transversely arranged with a 0.25 mm interval between adjacent fibers. The guide pin insertion holes had curved tapered as depicted in FIG. 6. The outer diameter of each optical fiber was about 0.25 mm. The ferrule, which was formed from glass-filled epoxy, had a pair of guide pin insertion holes and eight optical fiber holes. The guide pin insertion holes were about 0.71 mm in diameter. The entrance to the insertion holes had a maximum diameter of 1.32 mm. The radius of curvature of the sidewall entrance to the guide pin insertion holes was about 0.30 mm. After the optical fibers were inserted into the insertion holes and fixed with adhesive therein, an oblique polishing process was applied onto the mating facet of the ferrule to form an oblique surface which is inclined with respect to the optical axes of the optical fibers by an angle of 8 degrees, which is an angle that minimizes light reflected from the interface of single mode optical fibers. The cross sectional size of the connecting facet was about 11 mm$^2$. A buffing polishing process was then applied onto the obtained oblique surface so that the optical fibers extended about 0.00003 mm beyond the mating facet.

The experiment was conducted by measuring the connection loss after repeatedly mating and re-mating the connectors. The average loss remained below 0.30 dB even after being re-mated over 200 times.

Figure 9:
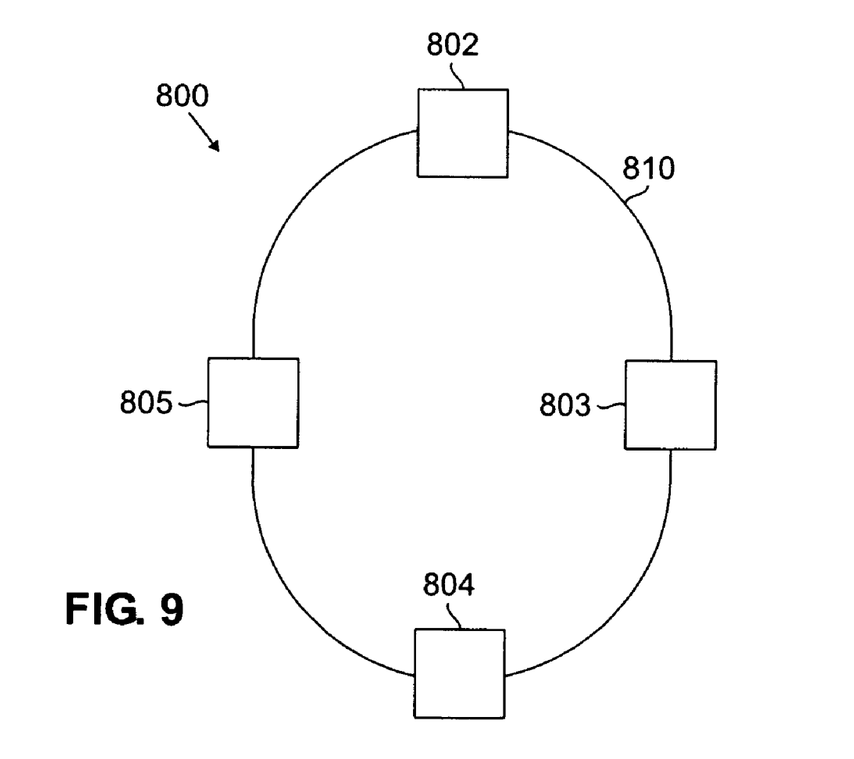
FIG. 9 shows a functional block diagram of an exemplary WDM ring network in which the one or more of the connectors of the present invention may be employed.

FIG. 9 shows a functional block diagram of an exemplary WDM ring network 800 in which the one or more of the connectors of the present invention may be employed. The connectors may be used to interconnect the various components of the network. In some cases the interconnections may be performed via an optical backplane. The backplane provides optical paths through which various optical modules are coupled. The backplane will typically be located in a rack in which the optical modules are to be located.

Ring network 800 includes a plurality of nodes 802–805 connected along a continuous, or looped, optical path 810. Each of these nodes is typically linked by a segment of optical fiber. Optical amplifiers 820 are located at appropriate points along the optical fiber segments Nodes 802–805 generally include an optical switch such as an optical crossconnect or an optical add/drop multiplexer (OADM), user interfaces, and a network management element. The optical switches may be static switches in which particular wavelengths received on optical path 810 can only be received by predetermined ones of the local ports of the nodes. Alternatively, one or more of the optical switches may be reconfigurable optical switches in which any wavelength channel can be selectively dropped to any local port of the nodes. Such reconfigurable optical switches may be electro-optical elements, or, more preferably, all-optical elements. Examples of an all-optical reconfigurable switch are disclosed in U.S. patent application Ser. Nos. 09/571,833 and 09/691,812, which are hereby incorporated by reference in their entirety Of course, those of ordinary skill in the art will recognize that the present invention is equally applicable to other network topologies in addition to rings such as mesh or point-to-point topologies, for example.

The invention claimed is:

1. A WDM optical communication system, comprising:
a plurality of network nodes;
at least one optical communication link interconnecting said nodes;
a multifiber optical fiber connector optically coupling said communication link to one of said nodes, said multifiber optical fiber connector including:
a first connector plug that includes:
a first housing through which extends a cable containing at least one optical fiber;
a first ferrule supported by said first housing for receiving said at least one optical fiber, said ferrule having a mating facet and an opposing rear facet located in said first housing, said first ferrule having at least one guide pin thru-hole and at least one optical fiber thru-hole extending between the mating facet and the opposing rear facet, said guide pin thru-hole having an opening portion extending inward from the mating facet, said opening portion being tapered to meet the mating facet in an oblique manner such that said opening portion has a diameter in the mating facet that is greater than a diameter of a remainder of the guide pin thru-hole;
a second connector plug for mating with the first connector plug, said second connector plug including:
a second housing through which extends a cable containing at least one optical fiber;
a second ferrule supported by said second housing for receiving a second plurality of optical fibers, said ferrule having a mating facet and an opposing rear facet located in said second housing, said ferrule having at least one guide pin receptacle and at least one optical fiber thru-hole extending between the mating facet and the opposing rear facet;
a guide pin secured in said guide pin receptacle.

2. The WDM optical communication system of claim 1 wherein said guide pin has an end portion distal from the second ferrule, said end portion being smoothly tapered.

3. The WDM optical communication system of claim 1 wherein said tapered opening portion of the guide pin thru-hole is defined by curved sidewalls.

4. The WDM optical communication system of claim 1 wherein said tapered opening portion of the guide pin thru-hole is defined by flat sidewalls.

5. The WDM optical communication system of claim 4 wherein the flat sidewalls form a 45° angle with respect to the mating facet.

6. The WDM optical communication system of claim 1 wherein said at least one guide pin thru-hole comprises a plurality of guide pin thru-holes and said at least one optical fiber thru-hole in each of the first and second ferrules comprises a plurality of optical fiber thru-holes.

7. The WDM optical communication system of claim 1 wherein said mating facets of the first and second ferrules define an oblique surface with respect to a longitudinal axis of their respective thru-holes.

8. The WDM optical communication system of claim 1 further comprising a guide pin holding member for supporting said guide pin in said guide pin receptacle.

9. The WDM optical communication system of claim 1 further comprising an engagement member for connecting said first and second housings together so that said guide pin extending from the second ferrule is secured in the guide pin thru-hole in the first ferrule.

10. The WDM optical communication system of claim 1 wherein said first and second connector plugs are MT-type connectors.

11. The WDM optical communication system of claim 1 wherein said first and second connector plugs are of a type selected from the group consisting of MPX, MPO, MTP, HBMT, SMC and OGI type connectors.

12. The WDM optical communication system of claim 1 wherein said first and second ferrules are formed from glass-filled epoxy.

13. The WDM optical communication system of claim 1 further comprising an optical backplane to which said multifiber optical fiber connector is connected.

14. An optical backplane, comprising
a support structure having at least one optical path extending thereon;
a multifiber optical connector for connecting an optical module to the optical path on the support structure, said multifiber optical connector including:
  a first connector plug that includes:
    a first housing through which extends a cable containing at least one optical fiber;
    a first ferrule supported by said first housing for receiving said at least one optical fiber, said ferrule having a mating facet and an opposing rear facet located in said first housing, said first ferrule having at least one guide pin thru-hole and at least one optical fiber thru-hole extending between the mating facet and the opposing rear facet, said guide pin thru-hole having an opening portion extending inward from the mating facet, said opening portion being tapered to meet the mating facet in an oblique manner such that said opening portion has a diameter in the mating facet that is greater than a diameter of a remainder of the guide pin thru-hole;
  a second connector plug for mating with the first connector plug, said second connector plug including:
    a second housing through which extends a cable containing at least one optical fiber;
    a second ferrule supported by said second housing for receiving a second plurality of optical fibers, said ferrule having a mating facet and an opposing rear facet located in said second housing, said ferrule having at least one guide pin receptacle and at least one optical fiber thru-hole extending between the mating facet and the opposing rear facet;
    a guide pin secured in said guide pin receptacle.

15. The optical backplane of claim 14 wherein said guide pin has an end portion distal from the second ferrule, said end portion being smoothly tapered.

16. The optical backplane of claim 14 wherein said tapered opening portion of the guide pin thru-hole is defined by curved sidewalls.

17. The optical backplane of claim 14 wherein said tapered opening portion of the guide pin thru-hole is defined by flat sidewalls.

18. The optical backplane of claim 17 wherein the flat sidewalls form a 45° angle with respect to the mating facet.

19. The optical backplane of claim 14 wherein said at least one guide pin thru-hole comprises a plurality of guide pin thru-holes and said at least one optical fiber thru-hole in each of the first and second ferrules comprises a plurality of optical fiber thru-holes.

20. The optical backplane of claim 14 wherein said mating facets of the first and second ferrules define an oblique surface with respect to a longitudinal axis of their respective thru-holes.

21. The optical backplane of claim 14 further comprising a guide pin holding member for supporting said guide pin in said guide pin receptacle.

22. The optical backplane of claim 14 further comprising an engagement member for connecting said first and second housings together so that said guide pin extending from the second ferrule is secured in the guide pin thru-hole in the first ferrule.

23. The optical backplane of claim 14 wherein said first and second connector plugs are MT-type connectors.

24. The optical backplane of claim 14 wherein said first and second connector plugs are of a type selected from the group consisting of MPX, MPO, MTP, HBMT, SMC and OGI type connectors.

25. The optical backplane of claim 14 wherein said first and second ferrules are formed from glass-filled epoxy.

26. The optical backplane of claim 14 further comprising an optical backplane to which said multifiber optical fiber connector is connected.

* * * * *

UNITED STATES PATENT AND TRADEMARK OFFICE
CERTIFICATE OF CORRECTION

PATENT NO. : 7,156,561 B2 Page 1 of 1
APPLICATION NO. : 11/417440
DATED : January 2, 2007
INVENTOR(S) : Naresh C. Patel et al.

It is certified that error appears in the above-identified patent and that said Letters Patent is hereby corrected as shown below:

Specification, Col. 1, line 15, after "connector", insert -- . --.
Specification, Col. 4, line 4, after "and", change "reached" to -- reach --.
Specification, Col. 4, line 41, before "ferrules", change "convention" to -- conventional --.
Specification, Col. 5, line 21, after "curved", insert -- , --.
Specification, Col. 5, line 21, after "tapered", insert -- openings --.
Specification, Col. 5, line 45, after "which", delete -- the --.
Specification, Col. 5, line 57, after "segments", insert -- . --.
Specification, Col. 6, line 5, after "their", change "entirety" to -- entireties. --.

Signed and Sealed this

Twenty-fourth Day of July, 2007

JON W. DUDAS
*Director of the United States Patent and Trademark Office*